United States Patent
Brock et al.

(10) Patent No.: US 7,150,043 B2
(45) Date of Patent: Dec. 12, 2006

(54) INTRUSION DETECTION METHOD AND SIGNATURE TABLE

(75) Inventors: Ashley Anderson Brock, Morrisville, NC (US); Nathaniel Wook Kim, Raleigh, NC (US); Kevin Thomas McClain, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 10/015,377

(22) Filed: Dec. 12, 2001

(65) Prior Publication Data

US 2003/0110393 A1 Jun. 12, 2003

(51) Int. Cl.
```
G06F 11/00   (2006.01)
G06F 11/22   (2006.01)
G06F 11/30   (2006.01)
G06F 11/32   (2006.01)
G06F 11/34   (2006.01)
G06F 11/36   (2006.01)
G06F 12/14   (2006.01)
H04L 9/00    (2006.01)
H04L 9/32    (2006.01)
G06F 7/04    (2006.01)
G06F 7/58    (2006.01)
G06F 15/16   (2006.01)
G06F 15/167  (2006.01)
G06K 19/00   (2006.01)
```

(52) U.S. Cl. ............................ 726/23; 726/21; 726/22; 726/25; 726/26; 726/6; 726/7; 713/150; 713/155; 713/164; 713/168; 709/200; 709/220; 709/223; 709/224; 709/225; 709/229

(58) Field of Classification Search ................ 726/1–4, 726/6–7, 21–30; 713/150, 155, 164, 168, 713/187–188; 709/200, 220, 223–225
See application file for complete search history.

(56) References Cited

U.S. PATENT DOCUMENTS

| | | | |
|---|---|---|---|
| 6,279,113 B1 * | 8/2001 | Vaidya | 726/23 |
| 6,681,331 B1 * | 1/2004 | Munson et al. | 726/23 |
| 2002/0112185 A1 * | 8/2002 | Hodges | 713/201 |

* cited by examiner

*Primary Examiner*—Ayaz Sheikh
*Assistant Examiner*—Longbit Chai
(74) *Attorney, Agent, or Firm*—David R. Irvin; Arthur J. Samodovitz

(57) ABSTRACT

Performance of a pattern-matching intrusion detection system (IDS) is improved by ranking signatures in its signature table by likelihood of occurrence, so that the table may be searched efficiently. Occurrence data associated with signatures is kept, and the ranking adaptively revised according to updates of the data. When the IDS detects a system event, the signature table is searched. If the search does not find a signature matching the event, thereby suggesting that the event poses no threat, a null signature is added to the signature table in a strategic location to terminate future searches early. In one embodiment, null signatures may be stored in a cache. When a system event is detected, the cache is searched. If a match is not found, the signature table is searched. If a match is not found in the signature table, a null signature is cached.

2 Claims, 5 Drawing Sheets

INTRUSION DETECTION METHOD AND SIGNATURE TABLE

FIELD OF THE INVENTION

The present invention applies generally to the field of data processing security, and more particularly to a method of improving the performance of an intrusion detection system that protects a device such as a network-connected computer from intrusions by vandals such as hackers.

BACKGROUND

Computer-based activities are now subject to electronic vandalism. A vandal, who is sometimes called a hacker in this context, may attempt to intrude upon a computer in order to steal information in an act of industrial espionage, or to alter records to the detriment or the benefit of another party's interests or reputation, or to impede the operation of the computer by implanting a virus or by flooding the computer with bogus information.

Computers are often protected against vandals' intrusions by intrusion detection systems. An intrusion detection system (IDS) monitors the activities of users and would-be users for particular events or patterns of events generally known as signatures. A signature typically includes a signature event, which may be the fingerprint of a sequence of actions that constitute misuse or unauthorized use of the computer. In many instances, a signature event may be a particular pattern of bits. For example, the signature event may be a pattern of bits that identifies an incoming message designed to induce a deliberate violation of a communication protocol, where the kind of violation may be indicative of a potential intrusion.

Signatures, and consequently signature events, are stored in a signature table within or associated with the IDS. In addition to a signature event, a signature in the signature table may include an associated signature event counter for counting the number of times the signature event occurs, and a signature threshold that may be used to differentiate between attempted intrusions and uneventful occurrences of the signature event. For example, the signature event may be required to occur J times in K minutes before an intrusion is suspected. Thus, for example, more than five occurrences in twenty minutes of the signature event "protocol violation 3" may serve as an indicator that an unauthorized party may be attempting to intrude upon the computer protected by the IDS.

When the intrusion detection system observes activity that is suggestive or indicative of an intrusion, for example when the value of a signature event counter crosses its associated signature threshold, the IDS may generate an alert. The purpose of the alert is to inform a network administrator of the intrusion, so that the administrator may act to minimize the damage done by the intruder. The alert may include other information drawn from the particular signature that is associated with the suspected intrusion, such as a priority or importance level suggesting the urgency of the need for defensive action, or instructions or data to help the administrator limit the damage done by the intruder.

One kind of particularly damaging intrusion is called a "denial of service" attack, in which a vandal floods a target computer such as an Internet-connected web server with a torrential flow of disruptive messages that overload the target to the point of functional failure. During a denial of service attack, the vandal may fraudulently assume a number of different electronic identities, often by including messages in the disruptive flow that have a variety of source addresses. Such a vandal is often called a spoofer.

In one kind of denial-of-service attack, a spoofer may send the target a large number of Internet Control Message Protocol (ICMP) messages called Packet INternet Gropers (PING), which are normally used to query whether a particular Internet address is accessible to the sender. Upon receiving a PING packet, the target responds to the spoofed device rather than the vandal, as the PING packet bears the fraudulently used identity of the spoofed device. By flooding the target with PING packets, the vandal may divert the target's resources to generating responses and consequently away from its legitimate tasks, and may also cause unproductive network congestion by triggering a flood of response messages.

In another kind of denial-of-service attack, the vandal may send the target a large number of TCP SYN messages. A TCP SYN message is normally used to initiate a TCP connection. Upon receiving a SYN message, the target sends a SYN/ACK message to the spoofed device rather than the vandal, as the SYN message bears the fraudulently used identity of the spoofed device. Further, the target reserves an internal data structure presumably to be used in supporting a connection with the spoofed device. So, by flooding the target computer with a large number of SYN messages, the vandal causes not only the problems mentioned above—resource diversion and network congestion—but also exhausts the target's capacity to support the data structures needed to establish other connections. Thus, the attack renders the target unable to establish connections with any device except the spoofed device.

Protective equipment may combat such attacks by filtering incoming messages according to information provided by the intrusion detection system. In this case, when the IDS detects the onslaught of a vandal's attack, the IDS reads the source addresses or other markings that the vandal usurps and fraudulently re-uses, and the IDS sends out alerts to inform the network administrator of the attack. The administrator may then configure the filtering equipment to block incoming messages that seem to originate from the malicious source.

To detect an intrusion, the IDS monitors system activity for the occurrence of system events, some of which may be signature events. When an event detector within the IDS detects a system event, logic within the IDS searches the signature table, looking for a signature whose signature event matches the system event. Although each such search may be accomplished easily, the search operation may consume significant resources during periods of intense activity. For example, when a vandal launches an attack that involves an onslaught of incoming messages, as in the case of a typical denial-of-service attack, the logic within the intrusion detection system repeatedly searches the signature table, looking for signature events that match the system events caused by the vandal. More particularly, when the signature table contains N signatures, on average each search of the signature table requires N/2 pattern-matching comparisons to find the signature whose signature event corresponds to the system event. Thus, during periods of intense activity such as a denial of service attack, the performance of the intrusion detection system may be limited to its capability to search the signature list.

Further complicating the situation, and perhaps more importantly, a system event does not always and necessarily indicate an intrusion; in fact, the contrary is normally true. The IDS event detector may routinely detect system events in the course of normal operation of the device protected by the IDS. The mechanism that distinguishes between signature events that pose a threat to the protected device and other system events that do not is the presence or absence of an associated signature in the signature table.

Consequently, the IDS must search its signature table in response to each system event to determine whether an associated signature is present in the signature table or not, and therefore whether the system event is indicative of a potential intrusion or not. However, since the vast majority of system events may pose no threat to the protected device, this kind of fruitless searching increases both system latency and processing load, again in proportion to the length of the signature table. More specifically, when the signature table contains N signatures, each signature-table search in response to detection of a routine system event requires N pattern-matching comparisons to determine that the signature table does not contain a matching signature event, and that the system event is therefore of no interest.

Today, for the reasons just mentioned, the signature-table search operation is time consuming and resource intensive, and promises to become even more so in the future as the sophistication and persistence of vandals increase, thereby necessitating longer signature tables. Thus there is a need for a way of improving the performance of an intrusion detection system, specifically the performance of the IDS signature-table search operation, to minimize system latency, to enable the IDS to provide more responsive defense against acts of vandalism such as denial-of-service attacks, and to ensure that the IDS does not itself become a performance bottleneck.

SUMMARY

The present invention improves the performance of an intrusion detection system (IDS) by providing a more efficient way for an IDS to manage and search its signature table.

According to one aspect of the invention, signatures in a signature table are ranked according to the observed or anticipated likelihoods of occurrence of their associated signature events, so that the signature table may be searched with maximum efficiency. According to another aspect of the invention, the ranking of signatures in the signature table may be adaptive and automated. When a particular signature event is identified by a search of the signature table, occurrence data associated with that signature event may be updated, and the ranking of the signatures revised to reflect the update. According to yet another aspect of the invention, when the search of the signature table fails to reveal a signature event that matches a particular system event, thereby suggesting that the system event does not pose a threat to the protected device, a null signature associated with the system event may be constructed and added to the signature table, stored therein, and ranked according to its observed or anticipated likelihood of occurrence. The purpose of a null signature is to terminate the search of the signature table early when a harmless system event occurs frequently. According to a further aspect of the invention, a null signature may be removed from the signature table after the expiration of a predetermined interval of time during which the associated signature event has not been detected, or simply after a predetermined time. According to another aspect of the invention, null signatures associated with system events that are observed or anticipated to occur frequently may be stored in a cache. The cache may be searched when a system event is detected. When a search of the cache does not reveal a signature event that matches the detected system event, the signature table may be searched. When the search of the signature table does not reveal a signature event that matches the detected system event, a null signature associated with the detected system event may be added to the cache. Addition of the null signature to the cache may be immediate, or may be conditional upon reaching a threshold for observed frequency of occurrence.

Thus, by ranking signature events according to their likelihoods of occurrence, by including null signatures associated with harmless but frequently detected system events in the signature table, and by maintaining a cache of frequently occurring signature events not indicative of an intrusion, the present invention improves the performance of an intrusion detection system by improving its signature-table search process. These and other aspects of the invention will be more fully appreciated when considered in the light of the following detailed description and drawings.

DETAILED DESCRIPTION

The present invention improves the performance of an intrusion detection system (IDS) so that the IDS may respond more quickly to suspected intrusions such as denial-of-service attacks and so that the IDS does not itself become a performance bottleneck during periods of normal operation.

Figure 1:
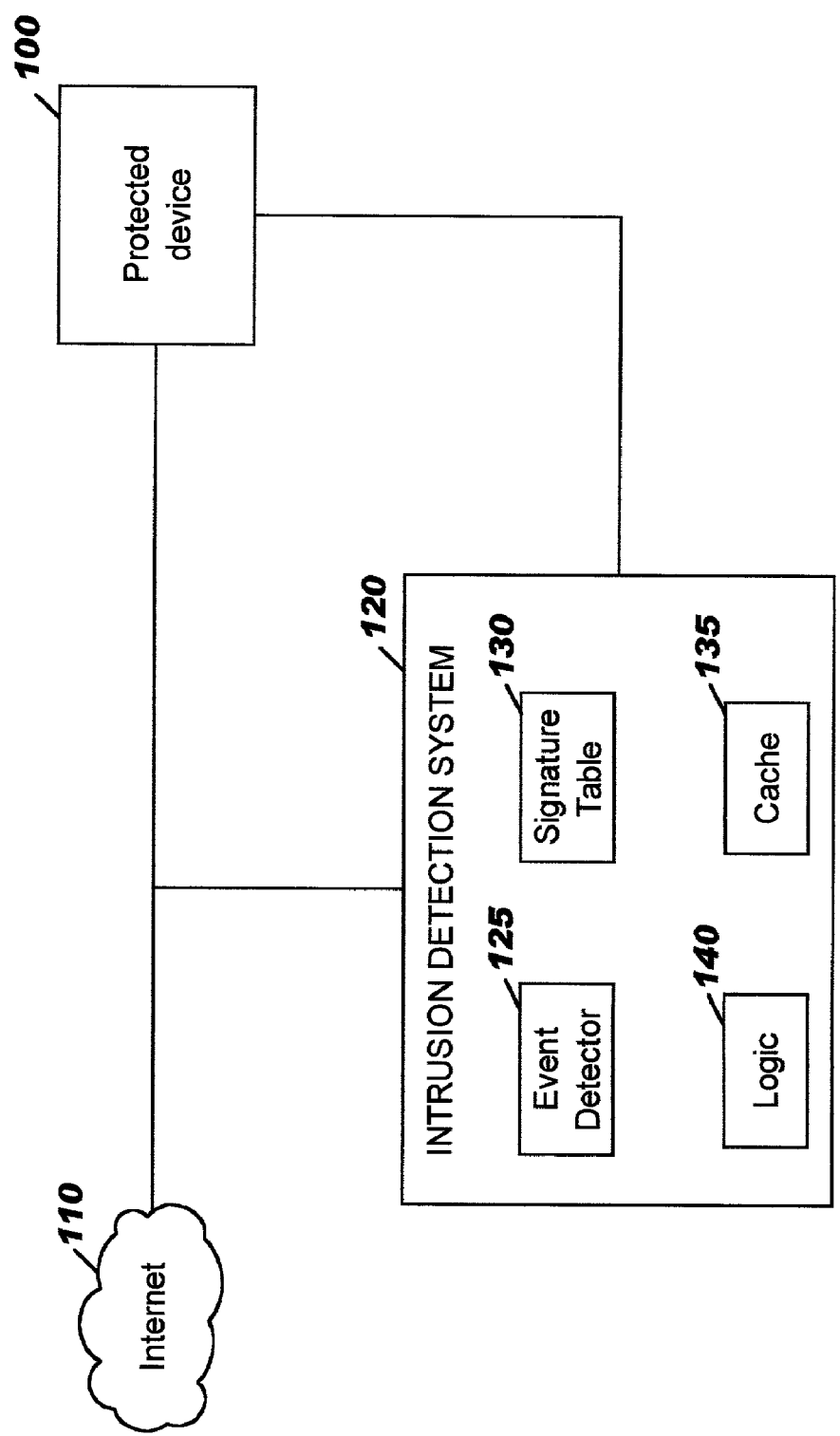
FIG. 1 is a block diagram that shows an exemplary structure of an intrusion detection system according to the present invention.

FIG. 1 is a block diagram that shows an exemplary structure of an intrusion detection system according to the present invention, in a suitable context. In FIG. 1, a protected device 100 such as a computer or a web server is protected by an intrusion detection system 120. A network management center 150 may receive alerts or other information provided by the intrusion detection system 120. FIG. 1 also shows the protected device 100 connected to the Internet 110, or equivalently to another communication network. A network connection is not a necessary condition of the invention, however, as the invention applies to host-based intrusion detection systems as well as network-based or network-connected intrusion detection systems.

The intrusion detection system 120 may include an event detector 125, a signature table 130, a cache 135, and logic 140. The particular structural division of the intrusion detection system 120 shown in FIG. 1 is for descriptive convenience only, and the present invention encompasses other structures serving the same purpose. For example, the event detector 125, the signature table 130, the cache 135, and the logic 140 may be re-cast as a microprocessor and its associated memory, or the cache 135 and the signature table 130 may be kept in different regions of a shared memory, and so forth.

Figure 2:
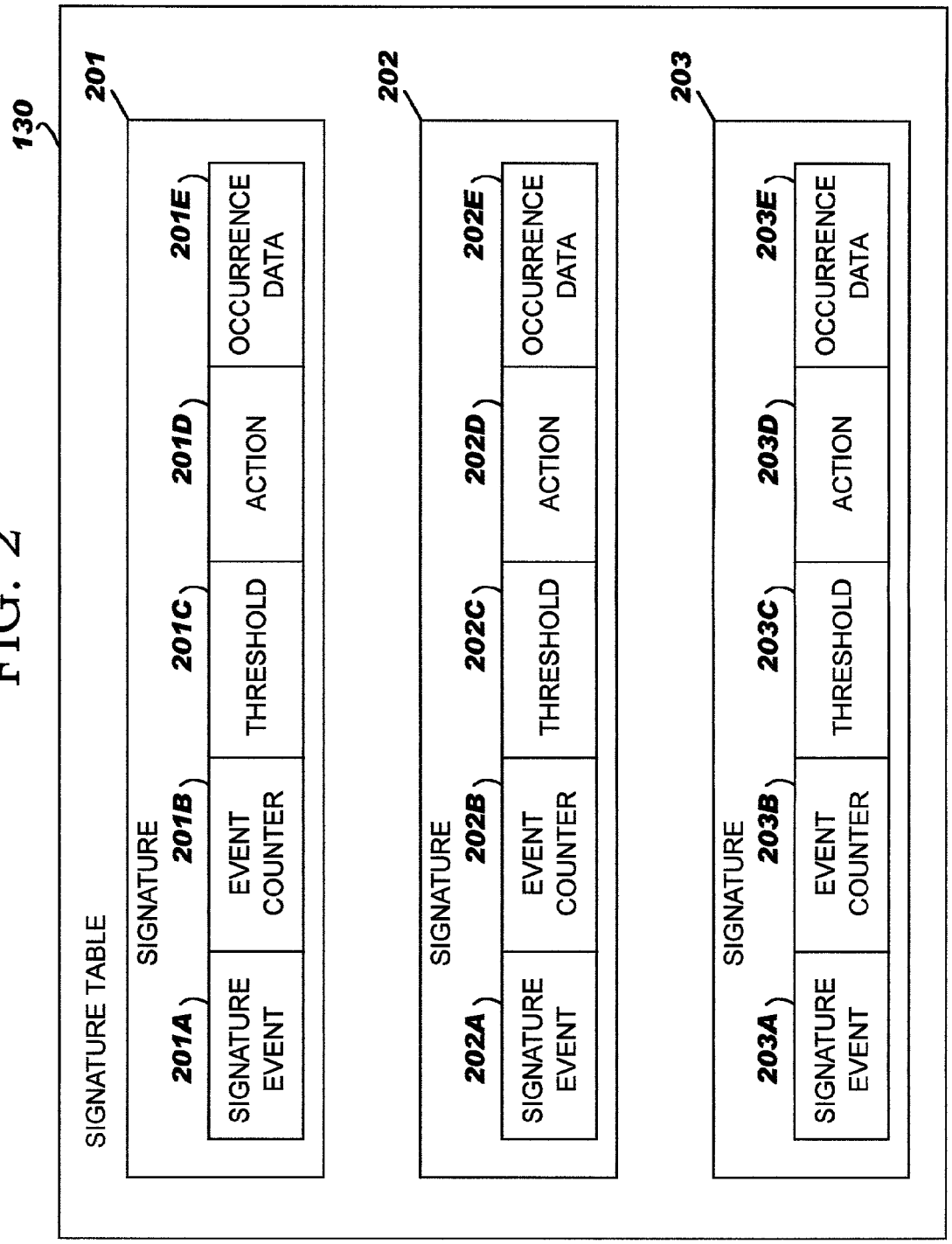
FIG. 2 is a diagram that shows an exemplary structure of the signature table of FIG. 1.

The intrusion detection system 120 monitors the activities of users and would-be users of the protected device 100 for particular system events or patterns of system events. Some of these system events may be indicative or suggestive of an intrusion. System events that are indicative or suggestive of an intrusion are called signature events. For example, a signature event may be a pattern of bits that identifies an incoming message designed to induce a deliberate violation of a communication protocol, where the kind of violation may be indicative of a potential intrusion. Signature events are included in or associated with signatures. Signatures may be stored in the signature table 130 of the intrusion detection system 120. FIG. 2 shows an exemplary structure of the signature table 130, including three exemplary signatures 201–203. The exemplary signatures 201–203 of FIG. 2 include signature events 210A–203A, respectively.

The event detector 125 monitors system activity for the occurrence of system events. Some system events may be signature events, which have particular significance, while other system events may be of no concern. When the event detector 125 detects a system event, the logic 140 within the IDS searches the signature table 130, looking for a signature event that matches the system event, in order to determine whether or not the system event is of any interest.

In addition to a signature event, a signature in the signature table 130 may include an associated signature event counter for counting the number of times the signature event occurs, and a signature threshold that may be used to differentiate between attempted intrusions and uneventful occurrences of the signature event. For example, the signature event may be required to occur J times in K minutes before an intrusion is suspected. Thus, for example, more than five occurrences in twenty minutes of the signature event "protocol violation 3" may serve as an indicator that an unauthorized party may be attempting to intrude upon the protected device 100. The exemplary signatures 201–203 of FIG. 2 include signature event counters 201B–203B and signature thresholds 201C–203C.

When the intrusion detection system 120 observes activity that is suggestive or indicative of an intrusion, for example when the value of a signature event counter crosses its associated signature threshold, the intrusion detection system 120 may generate an alert. The purpose of the alert is to inform a network administrator associated with the network management center 150 of the intrusion, so that the administrator, which may be a person or a stored-program machine, may act to minimize the damage done by the intruder. For the benefit of the network administrator, the alert may include suggested actions, for example "configure filter to block incoming messages with source address 00w.00x.00y.00z." The exemplary signatures 201–203 of FIG. 2 include actions 201D–203D, respectively.

According to the present invention, a signature such as one of the exemplary signatures 201–203 may include occurrence data, for example the occurrence data 201E–203E shown in FIG. 2. The purpose of the occurrence data is to track the frequencies of occurrence of the associated signature events. Thus, the occurrence data may include counts that are reset periodically. For example, every fifteen minutes the logic 140 may read the counts, compute the frequencies of occurrence of the associated signature events, and re-set the counts to zero. Alternatively, the occurrence data may include timestamps that mark the times at which the signature events occur. In this case the logic 140 may periodically tally, for example every two minutes, the numbers of timestamps associated with the signature events, therefrom compute the frequencies of occurrence of the signature events, for example their frequencies of occurrence over the trailing fifteen minute period, and delete expired timestamps, for example timestamps more than thirteen minutes old. It is not necessary that the occurrence data be held in the same memory or address space as other components of the signatures; the occurrence data may be held in a list or other structure elsewhere within or external to the intrusion detection system 120.

Although the exemplary signature table 130 of FIG. 2 is shown as a linear structure, which lends itself to a linear search, the present invention applies as well to signature tables with other kinds of organizations and other kinds of searches, for example trees.

Figure 3:
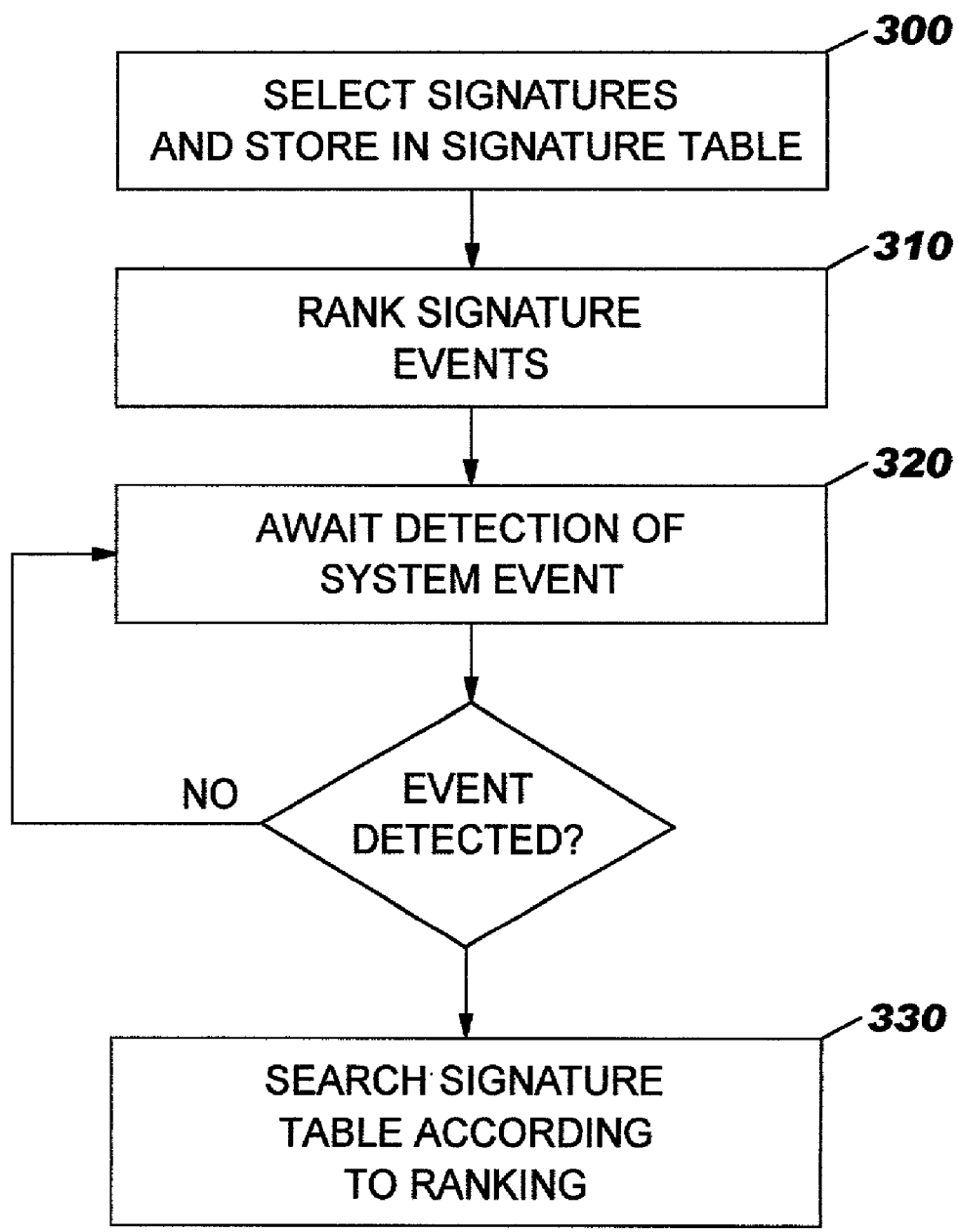
FIG. 3 is a flow chart that shows aspects of the present invention concerning the ranking of signature events.

FIG. 3 shows aspects of the operation of the present invention concerning the ranking of signatures. According to this aspect of the invention, signatures such as the exemplary signatures 201–203 are selected for inclusion in the signature table 130 (step 300). Selection may be provided by an outside authority, for example the manufacturer of the intrusion detection system 120 or the manufacturer of the protected device 100, or by personnel or equipment of the network management center 150, or by action of the logic 140 based on data provided externally or based on observations of the intrusion detection system 120 itself.

The signature events 201A–203A of the selected signatures 201–203 are then ranked (step 310) according to their observed or anticipated likelihoods of occurrence. The ranking may be done automatically, for example by the logic 140 working from the observed frequencies of occurrence determined according to the occurrence data 201E-203E as described above. Alternatively, the ranking may be done manually, for example by personnel of the network management center 150, based on the nature of the protected device 100 or its application. A manual ranking may take into account observed likelihoods of occurrence over a general population, or may take into account anticipated likelihoods of occurrence that recognize particular circumstances of the protected device 100. For example, a ranking according to anticipated likelihood of occurrence might take into account a premise that a denied log-on is more likely (or not) to occur than an attack that attempts to implant a virus, or might take into account aspects of the system itself for example a first signature event might be judged more likely than a second signature event because the protected device 100 has a first kind of operating system rather than a second.

Ranking may be numerical. For example, a set of N signature events may be ranked using the set of integers or natural numbers one through N, or by using an isomorphic set of symbols. Such a ranking is not, however, a condition of the invention. For example, the signature events may be sorted more coarsely into quartiles, or deciles, and so forth; or marked as "likely" and "unlikely"; or the most recently occurring signature event may be judged to be the most likely to occur next and therefore be ranked apart from the other signature events, for example by putting the most recently occurring signature event at the top of a search list; and so forth.

As shown in FIG. 3, the method then awaits detection of a system event by the event detector 125 (step 320). When the event detector 125 detects a system event, the logic 140 searches the signature table 130, looking for a match between the system event and a signature event of a signature in the signature table 130 (step 330). According to the present invention, the signature table 130 is searched in a sequence substantially according to the ranking of the signature events by likelihood of occurrence.

In a preferred embodiment, the signature table 130 is linear, holding N signatures. The signature events are ranked one through N, where rank-one is the most likely signature event and rank-N the least likely; the rank of a signature is the rank of its associated signature event. The signatures are held in the signature table 130 by descending rank so that the signature with the signature event of rank one is logically the first signature in the signature table 130, and the signature with the signature event of rank N is logically the last signature. In this embodiment, the logic 140 searches the signature table 130 beginning with the rank-one signature, proceeding in turn from the rank-M signature to the rank M+1 signature, until a match is found between the system event and a signature event of one of the signatures, or until the search ends because a match cannot be found.

Figure 4:
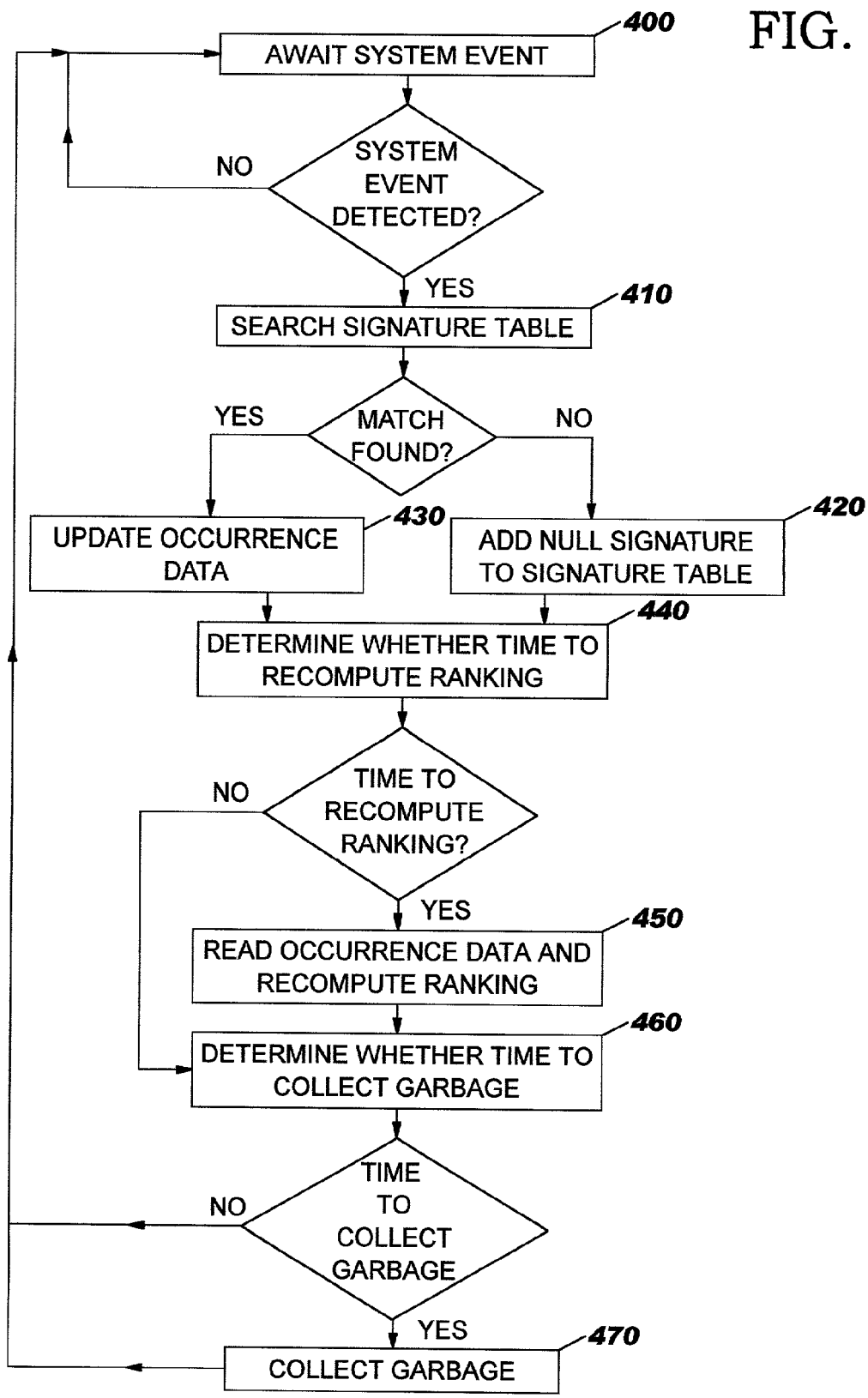
FIG. 4 is a flow chart that shows aspects of the present invention concerning the use of null signatures.

FIG. 4 is a flowchart that shows aspects of the present invention concerning the introduction and use of null signatures. In FIG. 4, the event detector 125 awaits arrival of a system event (step 400). When the event detector 125 detects a system event, the logic 140 searches the signature table 130, where the search may be conducted according to a ranking of the signature events by their likelihoods of occurrence as described above. The search looks for a match between the system event and a signature event of a signature in the signature table 130 (step 410).

If a match cannot be found, the logic 140 constructs a null signature, and inserts the null signature into the signature table 130 (step 420). For purposes of discussion, the third signature 203 of the exemplary signature table 130 shown in FIG. 2 might be a null signature. In the construction of the null signature, the system event may be used as the signature event 203A, the event counter 203B and event threshold 203C may be marked so as to indicate that occurrences of the signature event 203A do not cause the generation of alerts, the action 203D may be marked so as to indicate "no action," and the occurrence data may be appropriately entered, for example by setting a count to one when the null signature is constructed, or by recording a time stamp. In this way, the concept of "signature" is extended to include null signatures as well as signatures associated with signature events that are indicative or suggestive of intrusion. Thus a null signature is a special kind of signature associated with a frequently occurring system event that is not known to be indicative or suggestive of an intrusion.

Otherwise (i.e., the search finds a match), the occurrence data of the matching signature is updated, for example by increasing an associated count or by recording a time stamp (step 430).

Upon completion of the search, whether a match is found or a null signature is constructed, the logic 140 then determines whether time has come to re-compute the ranking (step 440). The ranking may stand unchanged indefinitely, or it may be re-computed at scheduled times, for example every two minutes, or it may be re-computed in response to the occurrence of a particular number of system events, for example re-computed upon the arrival of every tenth system event, or it may be re-computed when the logic 140 has otherwise-unused capacity, and so forth. If time has come to re-compute the ranking, the logic 140 reads the occurrence data, and re-computes the ranking (step 450), for example as described above. It is not necessary that the ranking after re-computation always or ever differ from the ranking before re-computation.

Upon completion of the re-computation of ranking, or when the logic 140 determines that time has not come to re-compute the ranking, the logic 140 determines whether time has come to collect system garbage (step 460). Garbage may be collected at scheduled times, for example every ten minutes, or garbage may be collected in response to the occurrence of a number of system events, for example collected upon the arrival of every tenth system event, or garbage may be collected when the logic 140 has otherwise-unused capacity, and so forth. When time has come to collect garbage, garbage is collected (step 470). To collect garbage, the logic 140 may, for example, examine the occurrence data of the null signatures in the signature table 130, and remove from the signature table 130 any null signatures whose associated signature events have become inactive. In this example, when the count of occurrences of a null signature's signature event is low, or if the time stamp of the most recent occurrence is old, the null signature may be removed. Upon completion of garbage collection, or when the logic 140 determines that time has not come to collect system garbage, the process returns to await further system events (step 400).

Figure 5:
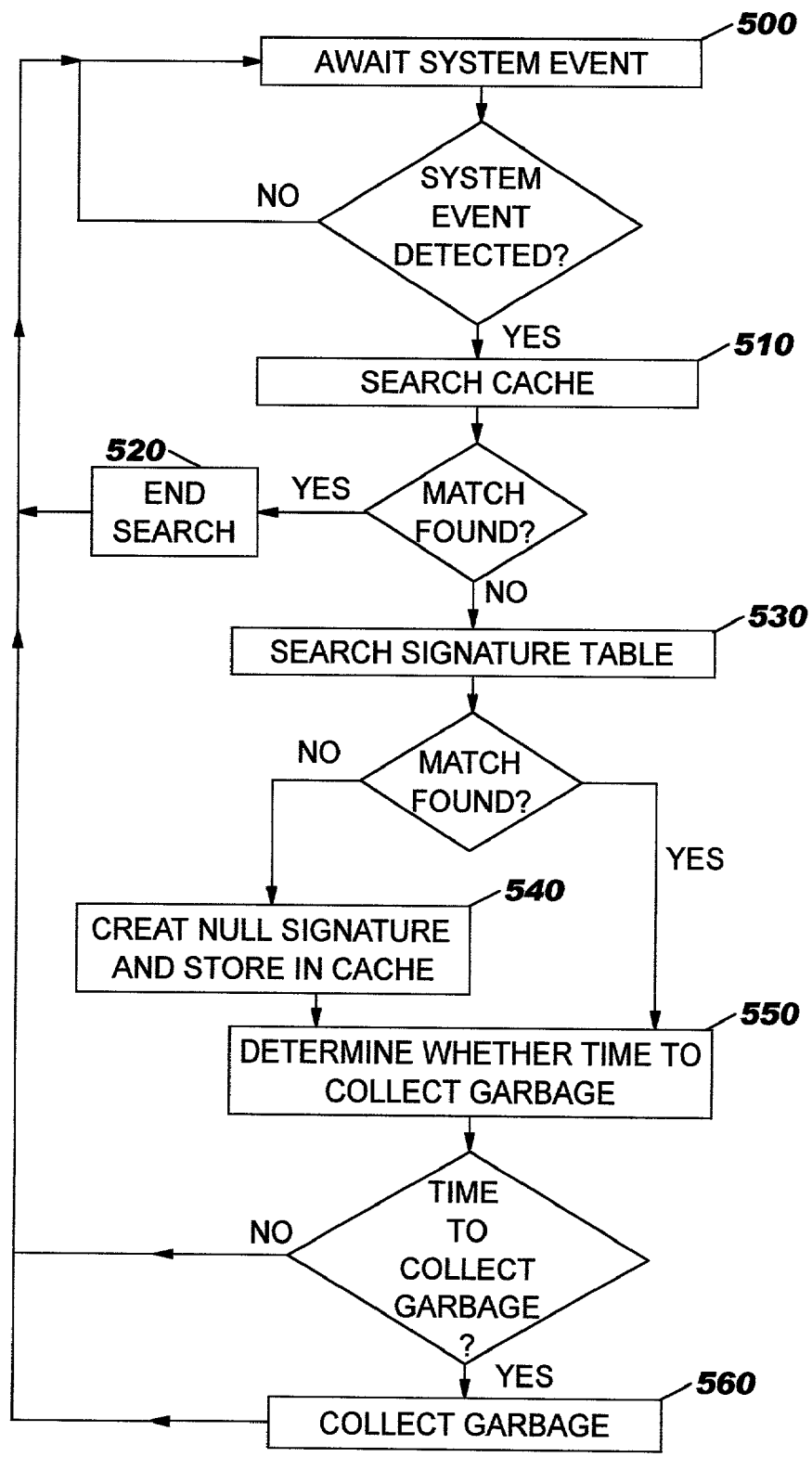
FIG. 5 is a flow chart that shows aspects of the present invention concerning the use of a memory cache for null signatures.

FIG. 5 is a flowchart that shows aspects of the present invention concerning use of a cache. Here, the cache 135 holds signature events of null signatures; the signature events may be included in null signatures stored in the cache 135, or they may stand alone in the cache 135. In FIG. 5, the event detector 125 awaits arrival of a system event (step 500). When the event detector 125 detects a system event, the logic 140 searches the cache 135, looking for a signature event of a null signature matching the system event (step 510). To improve the efficiency of the search of the cache 135, the entries of the cache 135 may be ranked by likelihood of occurrence, and the search conducted by rank according to the methods described earlier. It is not a necessary condition of the invention, however, that entries in the cache 135 be ranked or that the search of the cache 135 be conducted according to rank.

If a match is found, the search ends (step 520), and the process returns to await the next system event (step 500). Otherwise (i.e., a match is not found in step 510), the logic 140 searches the signature table 130, looking for a signature whose signature event matches the system event (step 530). The signature table 130 may contain null signatures as well as signatures that are not null signatures. The signatures in the signature table 130 may be ranked and searched accordingly as described above.

If a match is not found (in step 530), the logic 140 creates a null signature and stores the null signature in the cache 135 (step 540). In an embodiment wherein the cache 135 stores just signature events of null signatures rather than full null signatures, the logic 140 creates a signature event of a null signature, and stores the signature event in the cache 135.

On completion (of step 540), or when a match is found (in step 530), the logic 140 determines whether time has come to collect system garbage (step 550). When time has not come to collect system garbage, the process returns to await another system event (step 500). Otherwise (i.e., time has come to collect system garbage), garbage is collected (step 560). To collect garbage, the logic 140 may, for example, read the occurrence data of null signatures in the cache 135, and remove from the cache 135 any null signatures whose signature events have become inactive. For example, when the count of occurrences of the signature event of a null signature is low, or if the time stamp of the most recent occurrence is old, the associated null signature may be removed from the cache 135. Upon completion of garbage collection, the process returns to await the next system event (step 500).

From the foregoing description, those skilled in the art will appreciate that the present invention improves the performance of an intrusion detection system by increasing the efficiency of its signature-table search, so that the intrusion detection system may be more responsive to intense levels of traffic, such as the traffic generated by a denial of service attack, and so that the intrusion detection system itself does not become a performance bottleneck during routine operation. The foregoing description is illustrative rather than limiting, however, and the present invention is limited only by the following claims.

We claim:

1. A method of detecting intrusions, said method comprising the steps of:

storing a plurality of intrusion signatures;

automatically detecting a multiplicity of system events having respective signatures;

comparing each of the multiplicity of system event signatures to said plurality of intrusion signatures, one of said system event signatures not matching any of said intrusion signatures and not corresponding to an intrusion, and other of said system event signatures matching respective ones of said intrusion signatures; and storing said one system event signature in association with said plurality of intrusion signatures not corresponding to an intrusion;

recording a number of times that said each of said intrusion signatures matches a respective one of said system event signatures;

recording a number of times that said one system event has occurred;

subsequently ordering the stored plurality of intrusion signatures and said one system event signature based on the respective number of times that have been recorded for said plurality of intrusion signatures and said one system event signature, such that the signature for which the most number of times has been recorded is first in the order; and subsequently comparing a signature of a subsequent system event with said signatures in said order until finding a match between said subsequent system event signature and one of said signatures in said order.

2. A system for detecting intrusions, said system comprising:

a table storing a plurality of intrusion signatures;

means for detecting a multiplicity of system events having respective signatures;

means for comparing each of the multiplicity of system event signatures to said plurality of intrusion signatures, one of said system event signatures not matching any of said intrusion signatures and not corresponding to an intrusion, and other of said system event signatures matching respective ones of said intrusion signatures;

means for storing said one system event signature in association with said plurality of intrusion signatures;

means for recording a number of times that each of said intrusion signatures matches a respective one of said system event signatures;

means for recording a number of times that said one system event has occurred;

means for subsequently ordering the stored plurality of intrusion signatures and said one system event signature based on the respective number of times that have been recorded for said plurality of intrusion signatures and said one system event signature, such that the signature for which the most number of times has been recorded is first in the order; and means for subsequently comparing a signature of a subsequent system event with said signatures in said order until finding a match between said subsequent system event signature and one of said signatures in said order.

* * * * *

UNITED STATES PATENT AND TRADEMARK OFFICE
CERTIFICATE OF CORRECTION

| | | |
|---|---|---|
| PATENT NO. | : 7,150,043 B2 | Page 1 of 1 |
| APPLICATION NO. | : 10/015377 | |
| DATED | : December 12, 2006 | |
| INVENTOR(S) | : Ashley Anderson Brock, Nathaniel Wook Kim and Kevin Thomas McClain | |

It is certified that error appears in the above-identified patent and that said Letters Patent is hereby corrected as shown below:

In Column 9, Lines 18-20, it should be corrected to read --storing said one system event signature not corresponding to an intrusion in association with said plurality of intrusion signatures;--.

Signed and Sealed this

Sixteenth Day of September, 2008

JON W. DUDAS
*Director of the United States Patent and Trademark Office*